June 18, 1946.        R. POLK, SR., ET AL        2,402,181
METHOD AND MEANS FOR TREATING FRUITS HAVING PITS
Original Filed Sept. 12, 1941
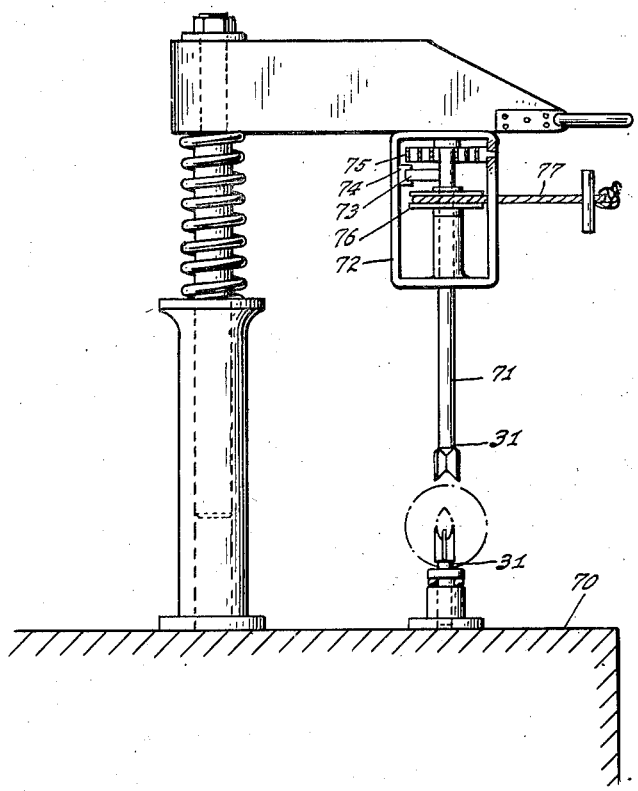
INVENTOR.
RALPH POLK SR., and
RALPH POLK JR.
BY
*Hood & Kahn*
ATTORNEYS.

Patented June 18, 1946

2,402,181

UNITED STATES PATENT OFFICE 2,402,181

METHOD AND MEANS FOR TREATING FRUITS HAVING PITS

Ralph Polk, Sr., and Ralph Polk, Jr., Tampa, Fla., assignors to The Polk Development Company (not incorporated), Tampa, Fla., a copartnership composed of Ralph Polk, Sr., and Ralph Polk, Jr.

Original application September 12, 1941, Serial No. 410,530. Divided and this application August 5, 1944, Serial No. 548,168

4 Claims. (Cl. 146—28)

This application is a division from our application Serial No. 410,530, filed September 12, 1941, now Patent 2,378,101.

The object of our invention is to provide an improved method and mechanism for sectionizing that type of fruit which comprises a central pit surrounded by an edible meat body, typified by the peach, and, more particularly, commercially useful for treating fruits of the specified type wherein the pits are relatively "free."

The drawing is an elevation of an embodiment of our invention.

In the drawing 70 indicates a suitable base upon which is journalled a pin 31 and aligned with that pin is another pin 31, the shank 71 of which is journalled in a carriage 72 slidably mounted on base 70 axially of the two pins 31—31. Shank 71 carries a stop arm 73 arranged to coact, in both directions of rotation of shank 71, with a stop finger 74 which is a portion of carriage 72. Shank 71 is rotationally biased in one direction by a spring 75 which normally holds arm 73 in engagement with finger 74. Shank 71 carries a pulley 76 around which is wound a cord 77 in a direction such that a pull on the cord will cause rotation of shank 71, and its finger 73, in opposition to the bias of spring 75.

The operation is as follows:

Fruit to be pitted, having been impaled upon one or the other of pins 31, carriage 72 is shifted to cause impalement of the fruit by the other pin 31 whereupon a sudden sharp pull upon cord 77 will rotate the fruit until rotation of the pins 31 is suddenly stopped by engagement of arm 73 with finger 74 in opposition to the pull exerted on the cord. This movement imposes upon the meat of the fruit sufficient circumferential energy to cause the fruit meat to slip circumferentially upon the pit and thus, when rotation of the pit is suddenly stopped, free the pit from the meat.

If desired, the fruit meat may be preliminarily segmented by radial slits, in which case the centrifugal force generated in the fruit meat will cause the meat segments to fly free from the fruit pit.

It will be readily understood that the mechanism disclosed in the drawing may be incorporated with meat slitting means and mechanisms to cause automatic operation without departing from the spirit of our invention.

We claim as our invention:

1. The method of treating fruit, having a pit, which comprises positively engaging and holding the pit for rotation about an axis of the pit, rotating the entire fruit about said axis at a speed sufficient to generate substantial circumferential energy in the meat, and suddenly stopping rotation of the pit thereby breaking the natural bond between pit and meat.

2. The method of treating fruit, having a pit, which comprises slitting the meat to form meat segments, positively engaging and holding the pit, rotating the slitted fruit about an axis extending through the pit, and suddenly stopping rotation of the pit thereby breaking the natural bond between pit and meat.

3. Apparatus for treating fruit having a pit, comprising a pair of aligned meat-penetrating and pit-engaging members, one movable relative to the other to cause meat-penetration and pit-engagement therebetween and rotatable about the common axis of said members, means by which said members with the intermediate fruit as a unit may be completely rotated at high speed about said axis, and means by which said rotation may be suddenly arrested.

4. Apparatus for treating fruit having a pit, comprising a main frame, a pair of fruit-meat penetrating and pit-engaging members journalled on said frame with a common axis, a carrier for one of said members movably mounted on said frame to cause meat-penetration and pit-engagement, means rotatively biasing one of said memers in one direction, means by which one of said members may be rotatively actuated in opposition to said bias, and means by which such rotation may be suddenly arrested.

RALPH POLK, SR.
RALPH POLK, JR.